United States Patent [19]
Jabsen

[11] 3,982,994
[45] Sept. 28, 1976

[54] GRID LATTICE WITH HORIZONTALLY-MOVABLE BAR

[75] Inventor: Felix Stanley Jabsen, Lynchburg, Va.

[73] Assignee: The Babcock & Wilcox Company, New York, N.Y.

[22] Filed: Feb. 24, 1975

[21] Appl. No.: 552,014

[52] U.S. Cl. .................................. 176/78; 176/76; 29/428
[51] Int. Cl.² ......................................... G21C 3/34
[58] Field of Search ...................... 176/76, 78; 29/235, 29/241, 428, 433

[56] References Cited
UNITED STATES PATENTS

| | | | |
|---|---|---|---|
| 3,665,586 | 5/1972 | Jabsen | 176/78 X |
| 3,795,040 | 3/1974 | Jabsen | 176/78 X |
| 3,892,027 | 7/1975 | Jabsen | 176/78 X |
| 3,904,475 | 9/1975 | Tashima | 176/78 |

Primary Examiner—Verlin R. Pendegrass
Assistant Examiner—Peter A. Nelson
Attorney, Agent, or Firm—J. M. Maguire; J. P. Sinnott

[57] ABSTRACT

A typical embodiment of the invention provides a means for selectively inserting and withdrawing one or more fuel rods from a fuel element cellular grid structure. The transverse stubs on one side of a long, thin bar are turned through 90° to extend across the gap between mutually perpendicular grid structure plates. The extreme ends of these stubs engage the adjacent portions of the associated plates that form part of the grid cells. Pressing the stubs against the plate portions through the application of appropriate force in a longitudinal direction relative to the bar deflects the engaged plates through a sufficient distance to enable fuel rods to be inserted into, or withdrawn from, respective cells. After rod insertion, the force applied to the bar is released to enable the plates to relax and engage the fuel rods. The bars are rotated once more through 90° and withdrawn from the grid structure. A similar procedure is employed to withdraw fuel rods from the grid structure.

2 Claims, 5 Drawing Figures

GRID LATTICE WITH HORIZONTALLY-MOVABLE BAR

BACKGROUND OF THE INVENTION

1. FIELD OF THE INVENTION

This invention relates to fuel elements for nuclear reactors and, more particularly, to methods and apparatus for inserting and withdrawing fuel rods from fuel element grid structures, and the like.

2. SUMMARY OF THE PRIOR ART

In order to function, nuclear reactors must have an inventory of fissionable material that will sustain a continuous sequence of fission reactions. Frequently, the uranium, or other nuclear fuel, is loaded into long, hollow and slender metal rods that are termed "fuel rods". These loaded fuel rods then are mounted together into groups each of perhaps 200 rods to form "fuel elements". A number of these fuel elements, when assembled, form one array which comprises the reactor core that provides the concentration of fissionable material which is needed to continue the fission process.

The fuel rods within the fuel elements usually are subjected to a number of adverse environmental conditions during reactor operation. In this respect, the heat generated in the fuel rods often is removed by means of the primary cooling water that flows through the reactor core in a direction which is parallel to the longitudinal axes of the fuel rods. Especially in connection with power reactors, the water flow velocity and the flow rate must be very high in order to remove the large quantity of heat that is generated. The surface area of the individual fuel rods, moreover, must be as fully exposed as possible to the flowing water in order to promote a high thermal conductivity between the fuel rod and the primary coolant and to prevent the development of "hot-spots" on the fuel rod due to poor local flow conditions, or the like.

Thus, fuel element structures are confronted with the need to satisfy two essentially conflicting requirements; the need to stabilize a large number of long, dense, nuclear fuel-filled thinwalled tubes that are exposed to the vibratory and other forces which are caused by very high cooling water flow rates, and the need to reduce the structural restraints on these fuel rods to a minimum in order to promote heat transfer from the rods to the coolant. To satisfy these essentially conflicting needs, fuel element grids often are used to stabilize the array of fuel rods within the grid structure. Usually, these grids comprise a cellular structure that is formed through the mutually perpendicular intersections of a group of interlocking metal plates. One fuel rod is lodged in each of the cells thus formed in the grid structure. Bosses and the like protrude from the surfaces of the portions of these interlocking plates that form the individual cell walls. These bosses engage the outer surface of the fuel rod within the particular cell and serve to restrain rod motion.

These bosses are of two basic types. One type of boss is of a very resilient character, being essentially spring-mounted. These resilient bosses permit the fuel rods to be inserted into the grid structure with relative ease. During reactor operation, however, the resilient nature of the boss mountings enables the bosses to move relative to the adjacent fuel rod surfaces. This motion produces an undesirable wearing or "fretting" of the rod surface that weakens the rod structure and can cause a failure.

The other type of boss is a very stiff and non-resilient arrangement that essentially eliminates relative movement between the fuel rods and the respective bosses. These stiff bosses, although eliminating "fretting" problems, nevertheless, lead to other difficulties. In this respect, it is difficult to lodge a fuel rod within a grid cell without scraping and gouging the rod surface against the relatively unyielding bosses. Scratches of this nature also weaken the fuel rod structure and establish corrosion loci, too.

Thus, there exists a need to provide an efficient and economical means for inserting fuel rods into the cells of a fuel element grid that has protruding non-resilient bosses without marring the rod surfaces.

SUMMARY OF THE INVENTION

These and other problems that have characterized the prior art are overcome, to a large extent, through the practice of the invention. Illustratively, the corners of the mutually perpendicular interlocking plates that form the cellular structure of the fuel element grids are provided with slits that are generally parallel to the longitudinal axes of the fuel rods.

A long thin bar is inserted into the grid structure through these slits in a direction that is generally parallel to one of the grid plates and perpendicular to those other plates that are normal to and interlock with the plate in question.

Stubs are formed on one side of the bar. These stubs are spaced from each other along the length of the bar by distances that are each equal to the width of a cell. These stubs protrude in a transverse direction relative to the length of the bar, moreover, for a distance that is substantially greater than the slit's transverse gap. The bar is inserted into the grid structure by orienting the stubs in a direction that is essentially parallel to the longitudinal axes of the fuel rods. In this manner, the bar will pass through the slits. The bar then is rotated through an angle of 90° in a direction that turns the stubs away from the grid plate with which the bar is parallel. The bar is then moved in a lengthwise direction to enable the stub extremities each to engage a portion of the adjacent respective plates which are perpendicular to and interlock with the grid plate with which the bar is parallel.

A further application to the bar of force in a lengthwise direction permits the stubs to deflect the bosses on the perpendicular plates out of their usual orientation. This temporary distortion of the individual cells, when duplicated with respect to one of the perpendicular plates in each of the cell structures, provides sufficient clearance for the fuel rods to be lodged in the grid structure without being gouged and scratched by protruding bosses.

On lodging the fuel rods within the grid structure, the lengthwise forces that are applied to the bars are relaxed to enable the deflected bosses to return to their normal positions within the cells and grasp or clutch the respective rods. The bars are once more rotated through 90° in order to disengage the stubs from the perpendicular plates and bring the stubs into general alignment with the longitudinal axes of the fuel rods. The bars then are withdrawn from the grid structure through the slits.

Thus, there is provided a technique for inserting fuel rods into a fuel assembly grid structure that prevents the rods from being marred or otherwise damaged during assembly. An essentially reverse, albeit similar procedure, is employed to withdraw fuel rods from a grid structure.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

DETAILED DESCRIPTION OF THE PREFERRED EMBODIMENTS

Figure 1:
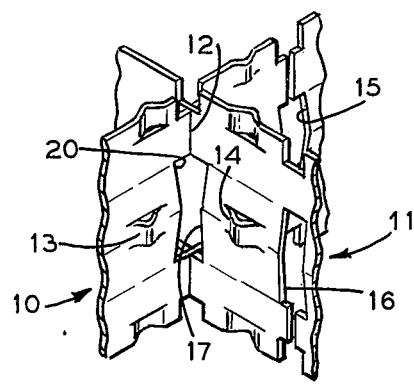
FIG. 1 is an assembly drawing, in perspective, of a portion of a fuel element grid for use in connection with the invention.

As shown in FIG. 1, two mutually perpendicular fuel element grid plates 10, 11 are interlocked at common corner 12 to form a portion of a cellular grid structure of a type that is described in more complete detail, for example, in F. S. Jabsen, U.S. Pat. No. 3,665,586, granted on May 30, 1972 for "Nuclear Fuel Rod Supporting Arrangements" and assigned to the same assignee as this invention. The plates 10, 11 are generally flat and formed from sheet metal, and the like. Bosses 13, 14 on the plates 10, 11, respectively, are formed in the plates, by stamping, for instance, and protrude from the surfaces of the plates toward the center of the cell that is formed, in part, by the two plates.

Apertures 15, 16 are cut in the plates 10, 11 at intervals that are equal to the length of one side of a cell.

Interlocking the plates 10, 11 at the common corner 12 cause the apertures at the corner 12 to form a slit 17. A gap 20 of predetermined depth, moreover, is provided in the slit 17 between the perpendicular plates 10, 11. In a similar manner, the apertures in each pair of mutually intersecting plates within the grid structure combine to form an aligned row of slits, each of these slits forming its own respective gap.

Figure 2:
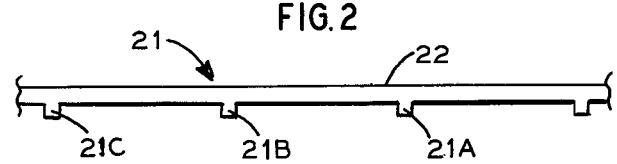
FIG. 2 is a plan view of a portion of a bar for insertion into the fuel element grid that is shown in FIG. 1.

None of these gaps, however, may be less than a minimum separation that is determined by the dimensions of bar 21, a portion of which is shown in FIG. 2. As shown in the drawing, an illustrative example of the bar 21 is formed of suitable metal in the shape of a long, slender shank 22 that has a generally rectangular cross section. In this respect, it should be noted, the thickness of the shank 22 in the dimensions that are perpendicular to the plane of the drawing are significantly smaller than the width of the gap 20 to enable the bar 21 to pass through an aligned row of slits and rotate through an angle of about 90° hereinafter described in more complete detail.

The bar 21 also is provided with an array of stubs 21A, 21B, 21C. These stubs all protrude from one side of the shank 22 in a direction that is transverse to the longitudinal axis of the bar 21. The individual extents of the protrusions 21A, 21B, 21C, when added to the thicknesses of the adjacent portions of the shank 22 are greater than the gap 20 (FIG. 1) that is formed by the slits at the common corner 12.

As shown in FIG. 2, the stubs 21A, 21B, 21C each are spaced from the opposite surface of the next adjacent stub a distance that is essentially equal to the separation between corresponding points in adjoining grid cells.

Figure 3:
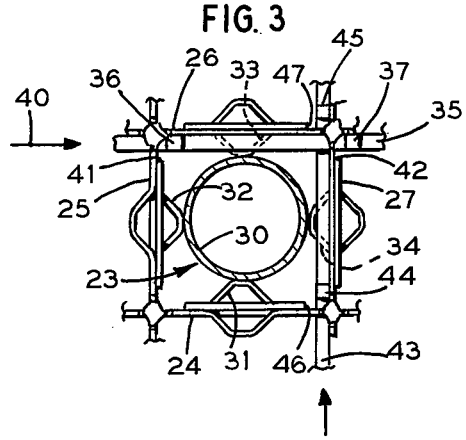
FIG. 3 is a plan view in full section of a grid, similar to the portion that is shown in FIG. 1, with two bars of the type that is shown in FIG. 2 inserted into the grid structure.

Further in accordance with principles of the invention a grid cell 23, as shown in FIG. 3, is formed by means of portions of four plates 24, 25, 26, 27. The plates 24, 26 and the plates 25, 27 are generally parallel. The plates 25, 27, however, are perpendicular to and intersect with the plates 24, 26. A fuel rod 30 is lodged within the cell 23. As mentioned above, the fuel rod 30 is a long, slender metal tube that encloses a stack of nuclear fuel pellets. As shown in FIG. 3, bosses 31, 32, 33, 34 protrude toward the center of the grid cell 23 and engage or clutch the outer surface of the fuel rod 30 in order to stabilize the rod.

Bar 35 is lodged within the cell 23 in a manner in which the lengthwise dimension of the bar is generally parallel to the grid plate 26. In order to insert the bar 35 into the cell structure, stubs 36, 37 on the bar are oriented in a direction that is generally parallel to the longitudinal axis of the fuel rod 30. The bar 35 is passed into and through the cell 23 by means of a lengthwise movement in the direction of arrow 40. Because gaps 41, 42 in the plates 25, 27, respectively, are greater than the transverse width of the bar 35, the bar passes through the gap 41, into the cell 23 and out of the cell by way of the gap 42 with relative ease.

In a similar manner, bar 43, with protruding stubs 44, 45 is passed through the cell 23 by way of gaps 46, 47 in the plates 24, 26, respectively.

Figure 4:
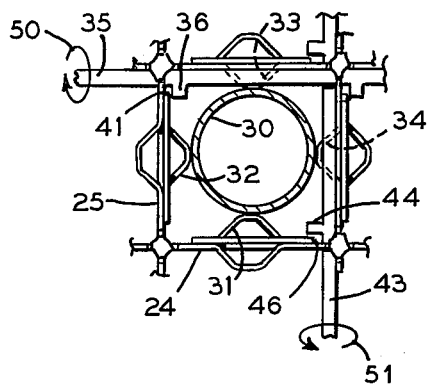
FIG. 4 is another plan view in full section of the portion of the grid that is shown in FIG. 3 with the inserted bars in a different orientation.

The bars 35, 43 shown in FIG. 4 have been rotated in the directions shown by arrows 50, 51 through an angle of about 90° in order to bridge the stub 36 on the bar 35 and the stub 44 on the bar 43 across the gaps 41, 46, respectively. Because the combined transverse length of each of the stubs 36, 44 and adjacent portions of the individual bars 35, 43 is greater than the transverse widths of the associated gaps 41, 46, the transverse ends of the stubs 36, 44 engage adjoining portions of the grid plates 25, 24, respectively.

Figure 5:
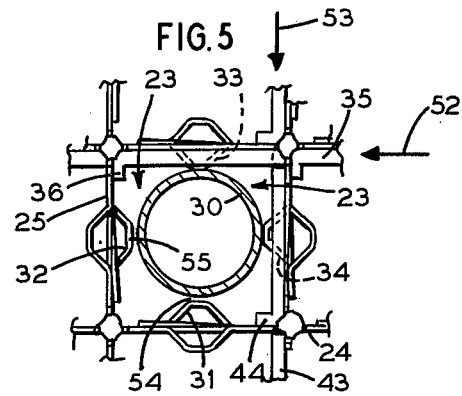
FIG. 5 is a further plan view in full section of the portion of the grid that is shown in FIGS. 3 and 4, with the grid structure deflected in accordance with the invention.

Lengthwise application of force to the bars 35, 43 in the directions of the arrows 52, 53, respectively, that are shown in FIG. 5 presses the stubs 36, 44 against the plates 25, 24 and thus deflects these plates out of their usual orientation relative to the center of the cell 23 and the longitudinal axis of the fuel rod 30. This temporarily induced deflection establishes clearances 54, 55 between the bosses 31, 32, respectively, and adjacent portions of the surface of the fuel rod 30. The small clearances 54, 55, however, are of sufficient magnitude to enable the fuel rod 30 to be withdrawn from the cell 23 in a direction that is parallel to the longitudinal axis of the rod and generally perpendicular to the plane of the drawing.

After the fuel rod 30 has been removed from the cell 23, the lengthwise forces applied to the bars 35, 43 indicated by the arrows 52, 53 are relaxed to enable the temporarily deflected grid plates 24, 25 to once more assume their usual orientation with respect to the center of the cell 23. Save for the presence of the fuel rod 30, this specific grid cell wall relationship is illustrated in FIG. 4 of the drawing.

The bars 35, 43, moreover, are withdrawn from the grid structure through a simple manipulation. In this respect, the bars 35, 43 are rotated either in the direction of the arrows 50, 51 through further angles of about 90°, or through other angles of essentially 90° in directions opposite to those shown by means of the arrows 50, 51. These rotations, in any event, align the stubs 36, 44 with the vertical axis of the cell 23 to restore the bars 35, 43 to the configuration that is illustrated in FIG. 3 (again, save for the presence of the fuel rod 30). Clearance now is provided between the transverse widths of the bars 35,43 and the respective widths of the gaps 41, 42 and 46, 47 that will enable the bars to be withdrawn from the grid structure through the associated gaps.

The fuel rod 30 (FIG. 5) is lodged in the structure of the cell 23 through an essentially reverse process. For example, the bars 35, 43 are inserted into the hitherto empty cell 23 with the stubs 36, 37, 44, 45 in general parallel alignment with the central axis of the cell. The bars 35, 43 are turned essentially through angles of 90° in order to permit the stubs 36, 44 to bridge the gaps 41, 46 and engage adjacent portions of the grid plates 25, 24. Lengthwise forces, relative to the longitudinal axes of the bars 35, 43, are applied in the direction of the arrows 52, 53 to press the stubs 36, 44 against the respective plates 25, 24 in order to deflect the plates and open the clearances 55, 54. On establishing the clearances 54, 55, the fuel rod 30 can be inserted into the cell 23 through a longitudinal movement without being subjected to gouging and scraping from the bosses 31, 32, 33, 34.

Upon lodging the fuel rod 30 within the cell 23, the lengthwise forces that were applied to the bars 35, 43 in the directions of the arrows 52, 53 are relaxed. This relaxation in the lengthwise forces permits the bosses 31, 32 to restore to the undeflected condition and thus clutch the surface of the fuel rod 30. The bars 35, 43 are rotated through respective 90° angles to orient the stubs 36, 37, 44, 45 in a direction that will enable the bars 35, 43 to be withdrawn from the grid structure through the gaps 41, 42, 46, 47.

The embodiments of the invention in which an exclusive property or privilege is claimed are defined as follows:

1. A cellular fuel element grid structure comprising, a first plurality of generally parallel apertured fuel element grid plates having protruding bosses formed thereon, a further plurality of apertured fuel element grid plates having protruding bosses formed thereon, said further plurality of plates interlocking with and being generally perpendicular to said first plate plurality to form common corners at said respective apertures in order to establish rows of aligned slits, a plurality of bars lodged within said slits, stubs formed on said bars, said stubs and said adjoining bar portions each having combined lengths that are greater than the widths of said respective slits to enable said stubs selectively to bridge across said slits and engage an adjoining portion of said grid plates and thereby to temporarily deflect said plates.

2. A method for inserting into and withdrawing nuclear fuel rods from a fuel element grid structure comprising the steps of inserting a bar having protruding stubs into the fuel element grid structure, turning said bar in a direction that enables said stubs to engage respective portions of the grid structure, and applying a lengthwise force to said bar in order to press said protruding stubs against the respective portions of the fuel element grid structure to deflect the structure and enable the fuel rods to be inserted into and withdrawn from the grid structure.

* * * * *